March 31, 1970 K. BRAUN ET AL 3,503,633
ELECTRICALLY INSULATING PIPE COUPLING ASSEMBLY, PARTICULARLY
FOR DOMESTIC BRANCH EXTENSIONS
Filed July 29, 1968
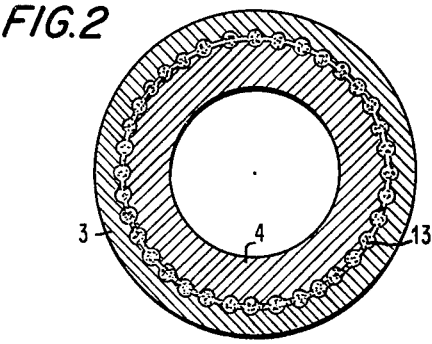
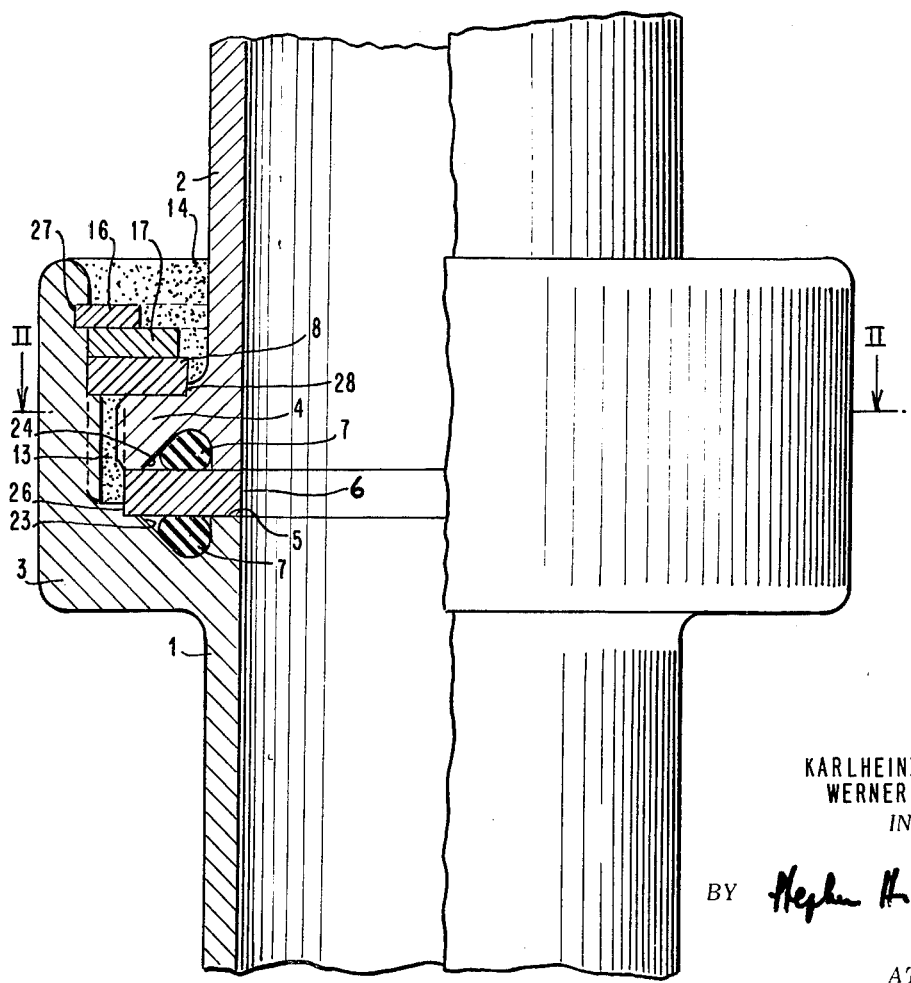
KARLHEINZ BRAUN
WERNER KIPPING
INVENTORS
BY
ATTORNEY United States Patent Office 3,503,633
Patented Mar. 31, 1970

3,503,633
ELECTRICALLY INSULATING PIPE COUPLING ASSEMBLY, PARTICULARLY FOR DOMESTIC BRANCH EXTENSIONS
Karlheinz Braun, Pfarrgasse 6, and Werner Kipping, Schanzweg 3, both of Kehl (Rhine), Germany
Filed July 29, 1968, Ser. No. 748,432
Claims priority, application Germany, Aug. 2, 1967, 1,625,987
Int. Cl. F16l 13/10, 11/00, 21/08, 21/02, 55/00, 59/16
U.S. Cl. 285—54                                    5 Claims

ABSTRACT OF THE DISCLOSURE

One pipe stub of the assembly has a circumferential flange, the other cup-shaped extension, into which the flange fits, with lateral clearance, to provide a compact, axially short coupling, a sealing ring is placed between the bottom of the cup, and the flange, another sealing ring on top, and the entire assembly held together by a C-ring snapped into a groove beyond the second sealing ring in the cup; after assembly epoxy resin is poured into the cup to seal the parts together. To insure against relative rotation of parts, for example where the pipe stubs are to be screw-connected, the outer edge of the flange and the inner edge of the cup are indented or crenelated, the epoxy resin filling all spaces and preventing relative rotation.

---

The present invention relates to pipe couplings which insulate the pipes which are being coupled together, and more particularly to such couplings in pipes supplying houses and homes, which couplings are of relatively short length, are inexpensive to be manufactured, and simple in assembly.

Electrically insulating pipe coupling assemblies, in which one pipe stub fits within a cup-shaped extended sleeve, of larger diameter, secured to the other pipe, are well known. Sealing and insulating rings are interposed between the pipe stubs themselves, later compressed to provide a tight seal, and held in position by means of a holding ring welded on the outer sleeve, and bearing against a ring of insulating material. To prevent relative rotation between the pipe stub parts, axially extending pins, individually secured to the respective pipe stubs, are then inserted into the insulating and sealing rings to hold the parts in their relative rotational alignment.

A coupling, as known, requires a fair amount of material and has a substantial axial extent. This axial extent is, in part, required so that the lengthwise extending pins, ensuring relative rotational stability of the two pipe stubs, may have sufficient strength. Additionally, when forming a weld, sufficient material had to be interposed between the point of the weld seam and the insulating rings against which metal, subject to welding, would bear, in order to prevent destruction of the heat-sensitive insulating material due to the heat during welding. For some constructions, additional heat sinks, and heat blocking arrangements and heat dissipating structures were used. Such additional heat dissipating, or heat blocking arrangements not only increased the length of the structure, but also the requirement for material and labor.

It is an object of the present invention to provide a pipe coupling which is electrically insulating, which is simple to assemble, short, and compact, and does not require welding to hold the coupling together.

SUBJECT MATTER OF THE PRESENT INVENTION

Briefly, in accordance with the present invention, one of the pipe stubs to be connected with the other terminates in a circumferential flange; the other pipe stub likewise terminates in a circumferential flange of one of the diameters larger than the flange on the first to which a sleeve is attached, to provide a cup-shaped assembly into which the first flange fits. The sleeve is of greater internal diameter than the external diameter of the flange on the first pipe stub. An electrically insulating sealing disc is interposed between the flanges to separate the parts in axial direction; a second insulating sealing disc is placed at the back side of the flange of the first pipe stub, and the assembly is held together by a C-ring snapped into a groove formed of the inside of the sleeve, the C-ring bearing, preferably over a spring disc, against the second sealing ring. To provide for proper separation of the outside diameter of the flange on the first pipe stub, and the inside surface of the sleeve, insulating material is placed therebetween, for example poured epoxy resin. To prevent relative rotation of the parts, the inner surface of the sleeve, and the outer facing surface of the flange are serrated, or crenalated, the poured epoxy filling the projections and recesses formed by the matching surfaces, thus insuring that the parts of the assembly are held together tightly, and preventing relative rotation.

The poured resin, for example epoxy, thus completely fills any spaces, sealing the entire assembly together. The use of the C-ring obviates the necessity of welding, and heat sinks, or heat-blocking structures, need not be used.

The electrically insulating pipe coupling assembly is particularly useful for pipes of smaller diameter, such as are used for pipes supplying houses and homes, where, nevertheless, electrical insulating is desired. This may be desirable for reasons of general safety or to prevent electrolytic corrosion, if the materials of which the pipe stubs are made are different, or if one of the pipes is cathodically protected. The resin, filling the spaces between the serrated or crenelated matching surfaces permits connection of the pipe stubs by ordinary thread couplings without danger of relative rotation of the two, electrically separated stubs, while using a minimum of material and a minimum amount of length. By extending the epoxy to completely fill the cup-shaped extension of the sleeve to the very end, a completely sealed assembly is provided positively excluding dirt and contamination.

The structure, organization, and operation of the invention will now be described more specifically with reference to the accompanying drawings, wherein:

FIG. 1 is a longitudinal view, partly in section, of a coupling assembly in accordance with the invention, when assembled; and FIG. 2 is a cross-sectional view in the direction of the arrow along line II—II of FIG. 1.

A pair of pipe stubs 1 and 2 are fitted together; pipe stub 1 has a flange-like extension to which a sleeve is secured, forming a cup-like structure 3, to receive the pipe stub 2, which is extended by a radial flange 4, of lesser external diameter than the internal diameter of cup-shaped sleeve 3. An insulating disc 6, for example of tightly woven cotton fabric, saturated with the resin, and substantially noncompressive, is located between the bottom surface 5 of the cup-shaped sleeve 3 and flange 4. Sealing rings, for example O-rings 7, for example of rubbery or elastic material, are located in suitable grooves 23, 24 of cup-shaped part 3 and flange 4, respectively. The insulating rings 7 provide for somewhat resilient sealing of the two pipe stub parts. The internal diameter of sealing ring or disc 6 is the same as the internal diameter of the pipes.

The inner surface of the cup-shaped enlarged sleeve 3 is spaced from the facing outer surface of flange 4. This space, 13, is filled with a flowable resin, such as epoxy, poured thereinto. The outer surface of flange 4 and the inner surface of sleeve 3 are serrated, or ribbed, or crenelated, the serrations extending in axial direction, as best seen in FIG. 2. When the resin in space 13 has hardened, it will form a strong and sure bond between the parts, and prevent relative rotation of pipe stubs 1 and 2, even if threaded couplings are threaded on the ends of the pipes.

The second sealing disc 8, likewise consisting of resin-impregnated tight fibers, is located above, that is at the back side of flange 4. Sealing disc 6 does not extend all the way across the flange part of the cup-shaped extension, but rather terminates at a shoulder 26; sealing disc 8, however extends clear across up the inner face of sleeve 3, and seats against a shoulder 28 formed on flange 4. Insulating disc 8 thus locates the flange 4, and with it pipe stub 2, in centered relation with respect to the cup-shaped sleeve 3. The ribbing of the inner surface of sleeve 3 stops short of the seating region for disc 8.

A disc spring 17, firmly presses insulating ring 8 against flange 4. Disc spring 17 is retained in position by a C-ring 16, snapped into a groove 27 formed in sleeve 3. The entire assembly is thus held pressed together, minor inaccuracies in manufacture, or fabricating tolerances being taken up by the spring disc 17. Epoxy resin is then poured in the space above the C-ring 16, to fill the cup-shaped sleeve and seal the parts together, and prevent contamination by moisture or dirt.

In assembly, pipe stub 1 with its cup-type sleeve extension is vertically positioned, elastic sealing ring 7 then placed in groove 23 and then the sealing disc 16 placed thereabove. The second sealing ring 7 is then placed on disc 6, and the flange 4, together with the second pipe stub 2 is placed thereover so that ring 7 will seat in groove 24. The second sealing disc 8 is then placed against shoulder 28 to locate the pipe stub 2 in centered position, and to space the outer edges of flange 4 from the inner surface of sleeve 3.

Next, spring disc 17 is slipped over insulating disc 8, the assembly is compressed, and C-ring 16 inserted in groove 27. Thereafter hot synthetic resin, such as epoxy, is poured into the assembly. When hot, such resin is so thin that it will penetrate between the flange 4 and disc 8 and completely fill the space 13 between the outer surface of flange 4 and the inner surface of sleeve 3, finally completely filling the space 14 above sealing disc 8 and C-ring 16. If necesary, and to insure free flowing, grooves may be located at the upper surface (with respect to FIG. 1), that is the back surface of flange 4, or at the inner surface of sleeve 3, although in actual practice it has been found unnecessary with free flowing material, and the additional machining may be avoided. After cooling, the resin will set and secure the two parts of the coupling against twist or rotation, the epoxy completely filling and sealing the coupling against the outside.

The invention is applicable in connection with any pipes for any uses, it is particularly adapted to introduce fluids, whether liquid or gas in the supply system of houses or homes. It may also be used with pipes which contain devices such as cables, which are to be sealed-in and separated from their surrounds.

We claim:
1. Electrically insulating pipe coupling assembly having a pair of pipe stubs (1, 2);
one (2) of said pipe stubs terminating in a circumferential flange;
the other of said pipe stubs (1) terminating in a circumferential flange interconnected with an outer, axially projecting sleeve (3) of greater internal diameter than the external diameter of the flange on the other pipe stub receiving said flange therein;
an electrically insulating sealing disc (6) separating said flanges in axial direction;
the outer surface of the flange on the first pipe stub and the inner surface of the sleeve facing said outer surface of the flange being serrated and forming axially directed facing projections and recesses;
a poured resin radially separating the flange on said first pipe stub and the inside of said sleeve and insulating said flange and stub from each other, said poured resin being located in the space between said flange and sleeve and filling said recesses;
a groove (27) formed at the inside of said sleeve (3) beyond the back side of the flange (4) on the first pipe stub;
a C-ring (16) inserted in said groove;
and means located between said C-ring (16) and the back side of said flange (4) including an insulating disc (8) separating said C-ring electrically from the back side of said flange and resiliently compressing said flanges toward each other.

2. Coupling according to claim 1 wherein said means located between said C-ring (16) and the back side of the flange comprises a resin impregnated fibrous disc (8) and a spring disc (17).

3. Coupling according to claim 1 further including an epoxy resin filling all remaining spaces in said assembly, said epoxy resin being poured to be flush with the outer end of said sleeve (3) to seal the first pipe stub and the sleeve of the other pipe stub together.

4. Coupling according to claim 1 wherein said poured resin is an epoxy resin, and additional epoxy resin is provided filling all remaining spaces in said assembly, said epoxy being poured to be flush with the outer end of said sleeve to seal the first pipe stub and the sleeve of the other pipe stub together.

5. Coupling according to claim 1 further including facing axially extending grooves (23, 24) formed in said flanges;
and resilient sealing means (7) located in said grooves, and bearing against said flanges and said sealing disc (6).

References Cited

UNITED STATES PATENTS

| 2,234,957 | 3/1941 | Boynton | 285—284 X |
| 2,749,154 | 6/1956 | Smith | 285—321 X |
| 2,752,579 | 6/1956 | Caldwell et al. | 285—48 X |
| 3,226,136 | 12/1965 | Braden | 285—321 X |

FOREIGN PATENTS

| 641,087 | 5/1962 | Canada. |
| 745,513 | 11/1966 | Canada. |

DAVID J. WILLIAMOWSKY, Primary Examiner

D. W. AROLA, Assistant Examiner

U.S. Cl. X.R.

285—284, 321, 330, 336